United States Patent
Kearney

[11] 3,876,126
[45] Apr. 8, 1975

[54] MOTOR HOUSING APRON COVER WITH POCKETS

[76] Inventor: James O. Kearney, 1369 Fort St., Apt. 216, Lincoln Park, Mich. 48146

[22] Filed: Aug. 13, 1973

[21] Appl. No.: 388,068

[52] U.S. Cl......... 224/42.42 R; 224/5 T; 224/29 R
[51] Int. Cl. ............................................. B60r 7/00
[58] Field of Search............... 180/69 R; 296/39 A; 224/42.42, 42.46, 45 P, 29 D, 5 T

[56] References Cited
UNITED STATES PATENTS

| | | | |
|---|---|---|---|
| 1,573,659 | 2/1926 | Thompson | 180/69 R |
| 1,675,072 | 6/1928 | Watermon | 224/5 T |
| 2,171,676 | 9/1939 | Wallace | 224/5 T |
| 2,767,895 | 10/1956 | Smith | 224/42.42 A |
| 2,908,434 | 10/1959 | Schnabel | 224/42.42 R |
| 3,112,810 | 12/1963 | Nallinger | 296/39 A |
| 3,630,343 | 12/1971 | Wohl | 224/42.42 R |
| 3,670,936 | 6/1972 | Pronovost et al. | 224/42.42 R |
| 3,717,188 | 2/1973 | Green | 224/45 P |

*Primary Examiner*—Robert J. Spar
*Assistant Examiner*—Kenneth Noland
*Attorney, Agent, or Firm*—Cullen, Settle, Sloman & Cantor

[57] ABSTRACT

The interior motor housing of a motor home or van or like vehicle has around the side walls near the top thereof, a series of spaced fasteners. An apron of flexible material having multiple pockets therein is draped around a portion of the housing and secured thereto by a series of snap fasteners.

1 Claim, 6 Drawing Figures

PATENTED APR 8 1975  3,876,126

MOTOR HOUSING APRON COVER WITH POCKETS

BACKGROUND OF THE INVENTION

In the conventional motor home or van or similar vehicle which might include buses and the like, there is provided a motor housing upon the interior thereof which normally has a flat top wall and with depending side walls which taper downwardly, outwardly and rearwardly to the vehicle floor. In the past, articles used by the driver or occupants have placed upon the top of the motor housing such as maps, packages, papers and the like. The problem has been that this provides a most unsecure mounting for such articles which are likely to fall to the floor or blow or, otherwise, be displaced.

It is known in the art that problems have heretofore existed of providing storage space upon the interior of a vehicle generally, with some suitable means for mounting the storage device upon the vehicle interior such as shown in the following U.S. Pat. Nos.: 770,354 W. Corfman; 791,598 J. P. Woodland; 1,527,056 M. Martin; 1,839,862 C. T. Bartlett; 2,507,842 N. C. Waddill; 2,532,517 D. B. Schwartzman, et al.; 2,835,425 K. J. Shultz; 2,979,098 R. K. Greaves; 3,151,649 E. F. Mitchell, Jr.

While the problem has long existed of providing some means of anchoring and storing various articles upon the interior of the motor housing, including soft drinks, newspapers, pads of paper, maps and the like, no convenient means have been provided by which these articles can be mounted upon the motor housing in a manner so as to be conveniently accessible to the driver or to passengers if desired.

BRIEF DESCRIPTION OF THE INVENTION

It is an object of the present invention to provide an improved assembly by which a series of storage areas may be arranged upon the side walls of the interior motor housing in such a manner as to be conveniently accessible to the driver or to passengers.

It is another object to provide upon the arcuate downwardly outwardly and rearwardly tapered side walls of a motor housing an apron of flexible material having a series of storage pockets therein of various sizes and shapes with a suitable means for movably mounting and securing said apron upon said housing so as to depend downwardly and to drape material and substantial portions of the side walls thereof.

These and other objects will be seen from the following specification and claims in conjunction with the appended drawing.

THE DRAWING

DETAILED DESCRIPTION OF THE INVENTION

Figure 1:
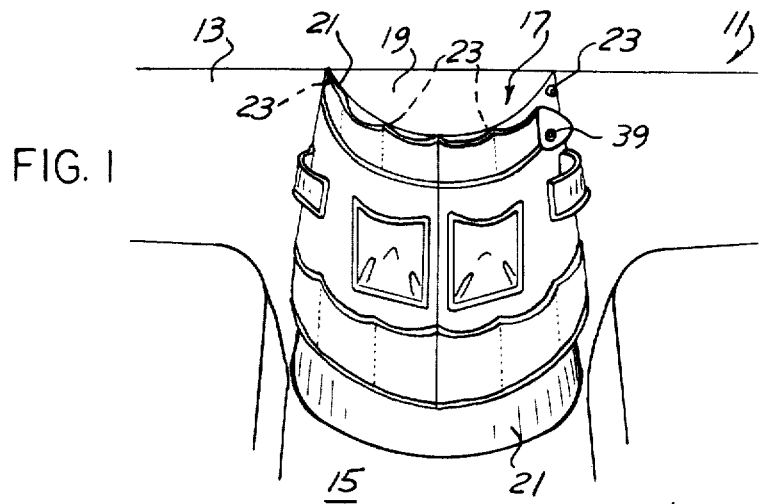
FIG. 1 is a front perspective view of a motor housing upon the interior of a motor home or van with the van body, dashboard and floor fragmentarily shown, as viewed looking forwardly towards the vehicle windshield and showing the present pocketed apron mounted upon said motor housing.

It will be understood that the above drawing illustrates merely a preferred embodiment of the invention, and that other embodiments are contemplated within the scope of the claims hereafter set forth.

Referring to the drawing, there is schematically and fragmentarily shown the interior of a motor home, van or like vehicle such as a bus or the like designated at 11, as including a conventional dashboard 13, floor 15 and motor housing 17.

While the motor housing might be rectangular or some other shape, these housings are usually arcuate in plan view.

In FIG. 1, upon the floor and in general registry with dashboard 13, the present motor housing has a flat top 19 with a rearward arcuate edge which may be circular or generally elliptical and which includes the depending sides 21 which extend downwardly, outwardly and rearwardly in a conventional manner.

Applied over a substantial portion of the side walls adjacent their top edges are a series of longitudinally spaced fasteners 23 of the snap-fastener type. These fasteners extend around a substantial portion of the periphery of the housing side walls adjacent the top 19.

A prefabricated flexible apron panel 27 of a suitable material, such as leather, Naugahyde, plastic or other flexible material is provided with a series of storage pockets of different shapes as designated at 29, 31 and 33.

The said pockets are provided upon the panel of material 27 and are suitably secured by stitching or otherwise, to form an apron as indicated at 25 which has thereon as an integral part thereof, a series of differently shaped sized and located storage pockets for the convenient storage of articles of various shapes.

Figure 2:
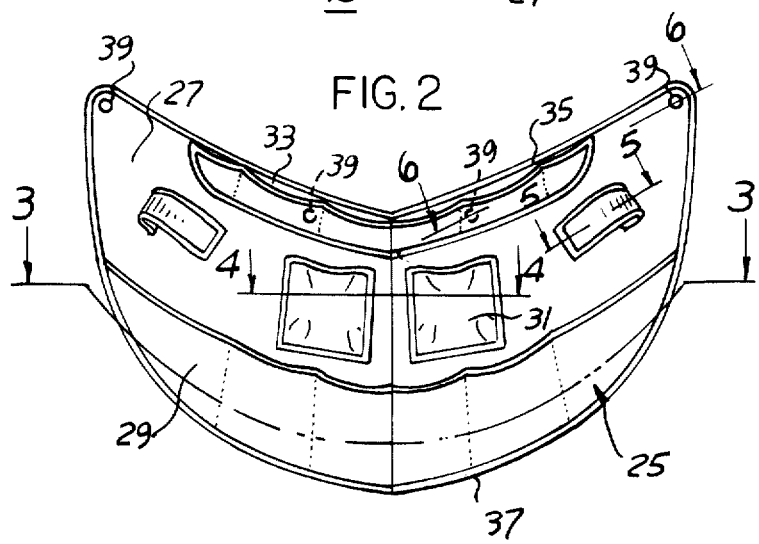
FIG. 2 is a plan view of the apron showing its form when laid flat upon a horizontal surface.
Figure 3:
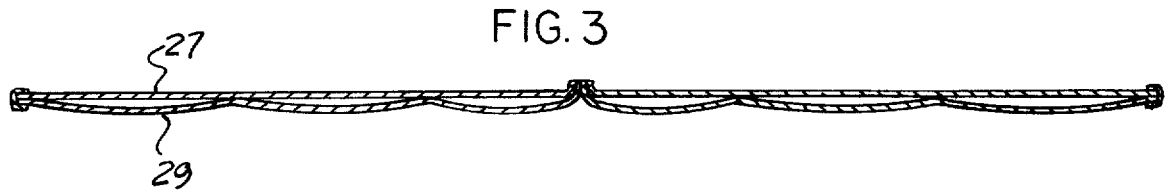
FIG. 3 is a section in the direction of arrows 3—3 of FIG. 2.
Figure 4:
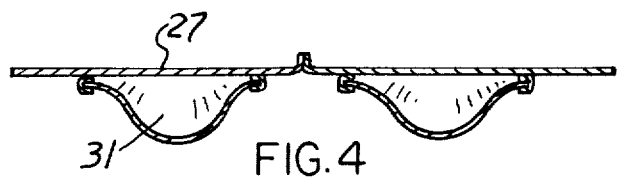
FIG. 4 is a fragmentary section taken in the direction of arrows 4—4 of FIG. 2.
Figure 5:
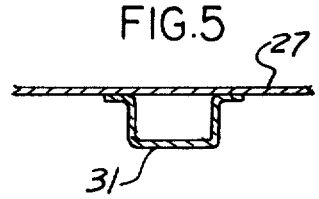
FIG. 5 is a fragmentary section taken in the direction of arrows 5—5 of FIG. 2.
Figure 6:
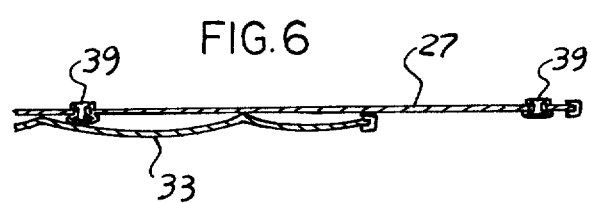
FIG. 6 is a fragmentary section taken in the direction of arrows 6—6 of FIG. 2.

As shown in FIG. 2, being a plan of the apron and lying upon a flat surface, the top margin thereof is arcuate and concave inwardly as shown at 35. Extending from the ends of said top margin, there is provided a generally arcuate convex shaped bottom margin which is suitably beaded as at 37.

Applied to the upper corners of the apron generally adjacent the top margin thereof, and at points intermediate the corners upon the interior wall of said apron are provided a series of snap-fasteners 39 adapted for cooperating snap and fastening registry with the fasteners 23 spaced around the margin as shown in FIG. 1.

This, thus, provides the draping of the apron 25 upon and around substantially total or partial portion of the side walls of the housing. In the assembled form, FIG. 1, the top and bottom margins of the apron are in general horizontal planes.

If desired, the fasteners 23 could be mounted below the upper edge of the housing top, though in the illustrative embodiment, it appears preferred that said fasteners be located adjacent the top edges of the side walls 21.

By the present construction, there is, thus, provided upon the motor housing a convenient series of article storage areas which will hold any number of articles, normally used by travelers or others, and wherein, said articles are conveniently accessible to the driver or passengers, as needed.

I claim:

1. In a motor home or van, the combination, a motor housing on the vehicle floor within the passenger compartment thereof, having a top wall and side walls;

said housing being generally arcuate in plan at its top with its sides being similarly shaped and tapered downwardly, outwardly and rearwardly to the vehicle floor;

a series of spaced fasteners upon said side walls adjacent the top thereof, extending around its periphery;

an apron of flexible material mounted upon said side walls overlying a portion thereof;

the upper margin of said apron being arcuate and concaved downwardly upon its interior so as to register with the housing side walls;

a series of pockets on said apron;

and a series of similarly spaced snap fasteners mounted adjacent the upper margin of said apron removably secured to said fasteners, said apron being draped around and depending along said downwardly tapered, outward and rearward housing side walls, to provide a series of article storage areas upon and around said motor housing, conveniently accessible to the driver or passenger upon the vehicle interior.

* * * * *